(12) United States Patent
Miyakawa

(10) Patent No.: US 8,577,922 B2
(45) Date of Patent: Nov. 5, 2013

(54) INFORMATION MANAGEMENT APPARATUS, DATA PROCESSING METHOD AND COMPUTER PROGRAM

(75) Inventor: Shinya Miyakawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/500,877

(22) PCT Filed: Oct. 7, 2010

(86) PCT No.: PCT/JP2010/067666
§ 371 (c)(1),
(2), (4) Date: Apr. 6, 2012

(87) PCT Pub. No.: WO2011/043429
PCT Pub. Date: Apr. 14, 2011

(65) Prior Publication Data
US 2012/0203787 A1    Aug. 9, 2012

(30) Foreign Application Priority Data

Oct. 9, 2009    (JP) ................................ 2009-235057

(51) Int. Cl.
*G06F 17/30*    (2006.01)
(52) U.S. Cl.
USPC ............ 707/791; 707/802; 707/822; 707/828
(58) Field of Classification Search
USPC ................................................ 707/600–899
See application file for complete search history.

(56) References Cited

U.S. PATENT DOCUMENTS

| | | | |
|---|---|---|---|
| 2002/0111172 A1 | 8/2002 | DeWolf et al. | |
| 2007/0106892 A1* | 5/2007 | Engberg | 713/168 |
| 2007/0281689 A1 | 12/2007 | Altman et al. | |
| 2009/0138276 A1 | 5/2009 | Hayashida et al. | |
| 2009/0199105 A1 | 8/2009 | Kamada et al. | |

FOREIGN PATENT DOCUMENTS

| | | |
|---|---|---|
| CN | 1758248 A | 4/2006 |
| CN | 101299769 A | 11/2008 |
| JP | 2002-244985 A | 8/2002 |
| JP | 2006-252207 A | 9/2006 |

(Continued)

OTHER PUBLICATIONS

Office Action, dated Apr. 17, 2013, issued by the State Intellectual Property Office of the People's Republic of China in counterpart Chinese Application No. 201080045395.7.

(Continued)

*Primary Examiner* — Issac M Woo
(74) *Attorney, Agent, or Firm* — Sughrue Mion, PLLC

(57) ABSTRACT

An information management apparatus includes: a data receiving section, a collected data storage section, an aggregating section, a feature extracting section, a determining section, and an evaluation data storage section. The data receiving section periodically receives action data showing an action of a user. The collected data storage section stores the action data received by the data receiving section every user. The aggregating section generates a data set every user by aggregating action data containing an approximate content, of the action data stored in the collected data storage section. The feature extracting section extracts an index and a reference showing privacy confidentiality of the data set as a feature to incorporate in the data set. The determining section determines whether or not the privacy confidentiality of the feature of the data set is equal to or higher than a predetermined level. The evaluation data storage section stores the data set which passed the determining section.

23 Claims, 15 Drawing Sheets

(56) References Cited

FOREIGN PATENT DOCUMENTS

| JP | 2008-293137 A | 12/2008 |
|----|---------------|---------|
| JP | 2009-043057 A | 2/2009  |
| JP | 2009-098205 A | 5/2009  |
| JP | 2009-129296 A | 6/2009  |
| JP | 2009-140151 A | 6/2009  |
| JP | 2009-187298 A | 8/2009  |
| WO | 0182562 A2    | 11/2001 |
| WO | 0217656 A2    | 2/2002  |

OTHER PUBLICATIONS

Mike Spreitzer et al., "Architectural Considerations for Scalable, Secure, Mobile Computing with Location Information", 1994, pp. 29 to 38.

Search Report dated Jul. 26, 2013; issued by the European Patent Office, in corresponding application No. 10822099.7.

* cited by examiner

Fig. 10A

| USER NAME | DATE AND TIME | POSITION COUNT |
|---|---|---|
| USER 1 | 2009-07-01T00:00+09:00 | (35.673014, 139.74269) |
| USER 1 | 2009-07-01T01:00+09:00 | (35.673110, 139.74289) |
| USER 1 | 2009-07-01T02:00+09:00 | (35.672871, 139.74355) |
| USER 1 | 2009-07-01T03:00+09:00 | (35.672699, 139.74283) |
| USER 1 | 2009-07-01T04:00+09:00 | (35.673014, 139.74269) |
| USER 1 | 2009-07-01T05:00+09:00 | (35.673014, 139.74269) |
| USER 1 | 2009-07-01T06:00+09:00 | (35.672871, 139.74355) |
| USER 1 | 2009-07-01T07:00+09:00 | (35.672699, 139.74283) |
| USER 1 | 2009-07-01T08:00+09:00 | (35.673014, 139.74269) |
| USER 1 | 2009-07-01T09:00+09:00 | (35.658587, 139.74425) |
| USER 1 | 2009-07-01T10:00+09:00 | (35.658587, 139.74425) |
| USER 1 | 2009-07-01T11:00+09:00 | (35.658587, 139.74425) |
| USER 1 | 2009-07-01T12:00+09:00 | (35.658587, 139.74425) |
| ... | ... | ... |

Fig. 10B

| USER NAME | DATE AND TIME | POSITION COUNT |
|---|---|---|
| USER 1 | 2009-07-02T00:00+09:00 | (35.673014, 139.74269) |
| USER 1 | 2009-07-02T01:00+09:00 | (35.673014, 139.74269) |
| USER 1 | 2009-07-02T02:00+09:00 | (35.672871, 139.74355) |
| USER 1 | 2009-07-02T03:00+09:00 | (35.673110, 139.74289) |
| USER 1 | 2009-07-02T04:00+09:00 | (35.672871, 139.74355) |
| USER 1 | 2009-07-02T05:00+09:00 | (35.672699, 139.74283) |
| USER 1 | 2009-07-02T06:00+09:00 | (35.673014, 139.74269) |
| USER 1 | 2009-07-02T07:00+09:00 | (35.673014, 139.74269) |
| USER 1 | 2009-07-02T08:00+09:00 | (35.672871, 139.74355) |
| USER 1 | 2009-07-02T09:00+09:00 | (35.676555, 139.74243) |
| USER 1 | 2009-07-02T10:00+09:00 | (35.676555, 139.74494) |
| USER 1 | 2009-07-02T10:00+09:00 | (35.675082, 139.74541) |
| USER 1 | 2009-07-02T10:00+09:00 | (35.675899, 139.74494) |
| ... | ... | ... |

Fig. 11

| No. | USER NAME | TIME ZONE | POSITION COUNT | NUMBER |
|---|---|---|---|---|
| N1 | USER 1 | 2009-07-01T00:00:00+09:00~2009-07-01T08:00+09:00 | (35.673014, 139.74269) | 9 |
| N2 | USER 1 | 2009-07-01T09:00:00+09:00~2009-07-01T12:00+09:00 | (35.678687, 139.74425) | 4 |
| N3 | USER 1 | 2009-07-02T00:00:00+09:00~2009-07-02T08:00+09:00 | (35.673014, 139.74269) | 9 |
| N4 | USER 1 | 2009-07-02T09:00:00+09:00~2009-07-02T12:00+09:00 | (35.676555, 139.4494) | 4 |
| ... | ... | ... | ... | ... |

Fig. 12

| No. | USER NAME | STAY POINT LIST | POSITION |
|---|---|---|---|
| S1 | USER 1 | N1, N3 | (35.673014, 139.74269) |
| S2 | USER 1 | N2 | (35.678687, 139.74425) |
| S3 | USER 1 | N4 | (35.676555, 139.4494) |
| ... | ... | ... | ... |

Fig. 13

| No. | FREQUENCY | PERIODICITY | CONTINUITY | DISPERSIBILITY |
|---|---|---|---|---|
| S1 | TWICE | EVERY DAY | 8 HOURS | 100m |
| S2 | ONCE | NONE | 3 HOURS | 200m |
| S3 | ONCE | ONCE/WEEK | 3 HOURS | 100m |
| ... | ... | ... | ... | ... |

Fig. 14

| FEATURE | LOWER LIMIT VALUE |
|---|---|
| FREQUENCY | TWICE |
| PERIODICITY | ONCE/WEEK |
| CONTINUITY | 5 HOURS |
| DISPERSIBILITY | WITHIN 100m |
| ... | ... |

Fig. 15

| No. | USER NAME | STAY POINT LIST | POSITION |
|---|---|---|---|
| S1 | USER 1 | N1, N3 | (35.673014, 139.74269) |
| S3 | USER 1 | N4 | (35.676555, 139.4494) |
| ... | ... | ... | ... |

Fig. 16A

| No. | POSITION | FREQUENCY | PERIODICITY | CONTINUITY | DISPERSIBILITY |
|---|---|---|---|---|---|
| S1 | (35.673014, 139.74269) | TWICE | EVERY DAY | 8 HOURS | 100m |
| S2 | (35.678687, 139.74425) | ONCE | NONE | 3 HOURS | 200m |
| S3 | (35.633014, 139.74269) | ONCE | ONCE/WEEK | 3 HOURS | 100m |
| ... | ... | ... | ... | ... | ... |

Fig. 16B

| No. | POSITION | FREQUENCY | PERIODICITY | CONTINUITY | DISPERSIBILITY |
|---|---|---|---|---|---|
| S1 | (35.673014, 139.74269) | TWICE | EVERY DAY | 8 HOURS | 100m |
| S2 | (35.678687, 139.74425) | ONCE | TWICE/WEEK | 3 HOURS | 200m |
| S3 | (35.633014, 139.74269) | ONCE | ONCE/WEEK | 3 HOURS | 100m |
| ... | ... | ... | ... | ... | ... |

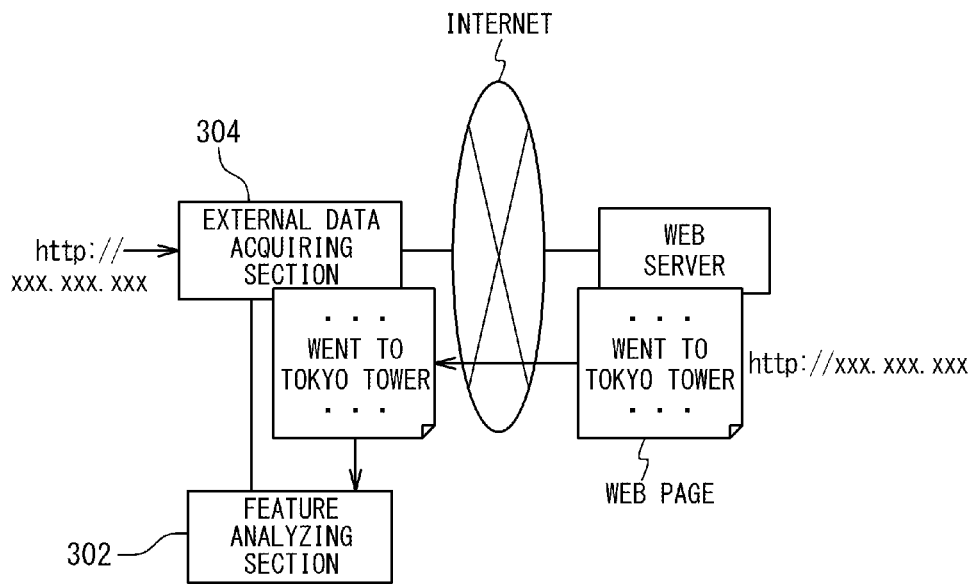

INFORMATION MANAGEMENT APPARATUS, DATA PROCESSING METHOD AND COMPUTER PROGRAM

CROSS REFERENCE TO RELATED APPLICATIONS

This application is a National Stage of International Application No. PCT/JP2010/067666 filed Oct. 7, 2010, claiming priority based on Japanese Patent Application No. 2009-235057 filed Oct. 9, 2009, the contents of all of which are incorporated herein by reference in their entirety.

TECHNICAL FIELD

The present invention is related to an information management apparatus, a data processing method and a computer program, and more particularly, to an information management apparatus, a data processing method and a computer program which processes privacy confidentiality of data.

BACKGROUND ART

In recent years, the service is increasing which uses position data which is measured by GPS (Global Positioning System) installed in a mobile terminal, a car and so on, and wireless LAN (Local Area Network) and so on. There is a case that a service provider which provides the service aggregates accumulates a plurality of position data as a position history. The position history contains data of high privacy confidentiality showing the position of a home of an individual, a hospital to be visited and so on in addition to the data of low privacy confidentiality showing that the individual (a user of a mobile terminal, a car and so on) visited a convenience shop and a position in a town.

By combining data of high privacy confidentiality, the feature of the individual such as hobbies and diversions can be clarified in addition to specifying the individual. Moreover, by analyzing the periodicity and frequency of the position data, there is a case that a current stay place of the individual and a place where there is a high possibility that it is possible to meet the individual. Therefore, there is a risk which suffers damage such as stalking, and slandering and slur. Also, even if the individual did not suffer damage directly, the individual has a feeling that his own private action is known to someone.

For this reason, the enterprise and the individual which retain data of high privacy confidentiality manages the data strictly in order to avoid a risk of leakage. When the data different in privacy confidentiality such as the position history mixed, the information management becomes possible according to the privacy confidentiality by appropriately separating and classifying the data. Also, it becomes easy to provide the personalized service by using only data of high privacy confidentiality.

As the technique which extracts important position data from position history, an example of a system which extracts a stay point is disclosed in Patent Literature 1. The system of Patent Literature (JP 2009-98205A) has a mobile equipment, a server and a display. The mobile equipment transmits data of a detected current position and an ID to the server. The server measures data of stay time in the current position, manages the data of stay time and the position every mobile equipment and a position where many mobile equipments stay for a relatively long time is specified. The display displays the position specified by the server on a map and changes display manner of the position. Thus, a place where many users stay is extracted as a place of high user collection ability.

Also, a system disclosed in Patent Literature 2 (JP 2009-43057A) has a user terminal unit, an action history storage section, an action history generating section and a business/private determining section. The user terminal unit detects data of position, noise, illumination of the user and time and so on. The action history storage section distinguishes a movement time band and a stay time band from the data detected by the user terminal unit and specifies a stay position. The action history generating section specifies an illumination level and a sound noise level of the position. The business/private determining section distinguishes the stay position to a business POI and a private POI by using the time zone, the illumination level, and the sound noise level.

As the related technique, an action history management system is disclosed in Patent Literature 3 (JP 2006-252207A). The action history management system is provided with a position data providing server, an action history management apparatus, and a client. A position data providing server is provided with a section of transmitting the position data containing ID data, position data of a mobile terminal related to a user and time data in which the position data is acquired. The action history management apparatus has a position data acquiring section, a message analyzing section, a log generating section, a log shaping section and an action history database.

Here, the position data acquiring section receives the position data from the position data providing server, and receives the position data and classifies the position data every attribute, in order to store a position where the user stayed in a specific time zone, a person having a mobile terminal who was near to the user in the time zone at a same time. The message analyzing section converts data containing the measured time and position into the form suited for log. The log generating section generates a log which contains the position data every constant time and a person who was nearby. The log shaping section acquires display data of the log data. The client is connected to the action history management apparatus through a network.

An individual management apparatus is disclosed in Patent Literature 4 (JP 2008-293137A). This individual management apparatus is provided with a first maintenance section, a second maintenance section and an evaluating section. The first maintenance section maintains first data based on the position data detected by using a position detector which each of the plurality of individuals retains. The second maintenance section maintains second data based on the action history of each individual. The evaluating section evaluates a relation of each individual and a position detector which each individual retains based on the first data and the second data.

An action history analysis system is disclosed in Patent Literature 5 (JP 2009-140151A). This action history analysis system analyzes the action history of a user, and is provided with a position measuring section, a position history storage section, a position action correspondence data storage section and an analysis section. The position measuring section has a function of acquiring the position data of the user. The position history storage section has a function of storing the position data of the user acquired from the position measuring section. The position action correspondence data storage section has a function of storing position action correspondence data which is described with a method of determining the action of the user, based on the position data of the user. The analysis section has a function of generating and outputting the action history data of the user by using the position data stored in the position history storage section and the position action correspondence data stored in the position action correspondence data storage section.

CITATION LIST

[Patent Literature 1] JP 2009-98205A
[Patent Literature 2] JP 2009-43057A
[Patent Literature 3] JP 2006-252207A
[Patent Literature 4] JP 2008-293137A
[Patent Literature 5] JP 2009-140151A

SUMMARY OF THE INVENTION

In the system disclosed in Patent Literature 1, a place where many users gather is extracted as a highly attractive place. Therefore, the place of high privacy confidentiality such as a home of a user where the user stays for a long time and other users are few cannot be extracted.

In the system in Patent Literature 2, a stay point is classified into the business POI and the private POI by using a time zone, an illumination level and a sound noise level. Therefore, when the sound noise level, the illumination and the privacy confidentiality are weakly related to each other, the privacy data of high privacy confidentiality can not be always extracted.

These problems would be caused in the same way in a life log (also called action data, in this example) which collects data showing the action of the user in addition to the position history of the position data. The action data (life log) can be grouped based on the user identifier (user name) and the data history. As such a data history, a Web reference history, a purchase history using credit cards and so on, a position history using a mobile terminal and a car navigation system, a health management data history such as a beat, a weight, a body fat percentage, a blood pressure, and the number of steps and the camera picture history and so on are exemplified in addition to the position history by above-mentioned position data.

The present invention was made in view of the above mentioned problem, and an object of the present invention is to provide an information management apparatus, a data processing method, an information management system and a computer program, in which data of privacy confidentiality can be extracted from miscellaneous action data.

Therefore, to solve the above problem, the information management apparatus of the present invention includes: a data receiving section, a collected data storage section, an aggregating section, a feature extracting section, a determining section, and an evaluation data storage section. The data receiving section periodically receives action data showing an action of a user. The collected data storage section stores the action data received by the data receiving section every user. The aggregating section generates a data set every user by aggregating action data containing an approximate content, of the action data stored in the collected data storage section. The feature extracting section extracts an index and a reference showing privacy confidentiality of the data set as a feature to incorporate in the data set. The determining section determines whether or not the privacy confidentiality of the feature of the data set is equal to or higher than a predetermined level.

Also, in a data processing method of an information management apparatus, the information management apparatus includes a collected data storage section configured to store action data shoring an action of a user every user. The data processing method includes: periodically receiving the action data to store in the collected data storage section; generating an data set every user by aggregating the action data, which have an approximate content, of the action data stored in the intelligence section to generate a data set every user; extracting as a feature, an index and reference showing the privacy confidentiality of the data set as the feature to incorporate into the data set; determining whether or not the privacy confidentiality of the feature of the data set is equal to or higher than a predetermined threshold value; and storing the data set which passed the determining section in an evaluation data storage section.

Moreover, a program of the present invention is the program to make a computer execute the above data processing method of the information management apparatus.

According to the present invention, the data corresponding to privacy confidentiality can be extracted from miscellaneous position data. Thus, the position data management corresponding to privacy confidentiality can be carried out.

BRIEF DESCRIPTION OF THE DRAWINGS

FIG. 10A is a diagram showing the processing of the information management apparatus in an implementation example of the present invention;

FIG. 10B is a diagram showing the processing of the information management apparatus in the implementation example of the present invention;

FIG. 11 is a diagram showing the processing of the information management apparatus in another implementation example of the present invention;

FIG. 12 is a diagram showing the processing of the information management apparatus of the implementation example of the present invention;

FIG. 13 is a diagram showing the processing of the information management apparatus in another implementation example of the present invention;

FIG. 14 is a diagram showing the processing of the information management apparatus in another implementation example of the present invention;

FIG. 15 is a table showing an example at an evaluation data storage section of the information management apparatus according in the implementation example of the present invention;

FIG. 16A are a diagram showing the processing of the information management apparatus of the implementation example of the present invention;

FIG. 16B is a diagram showing the processing of the information management apparatus in the implementation example of the present invention;

FIG. 17 is a diagram showing the processing of the information management apparatus in the implementation example of the present invention; and FIG. 18 is a diagram showing the processing of the information management apparatus in the implementation example of the present invention.

DESCRIPTION OF EXEMPLARY EMBODIMENTS

Figure 1:
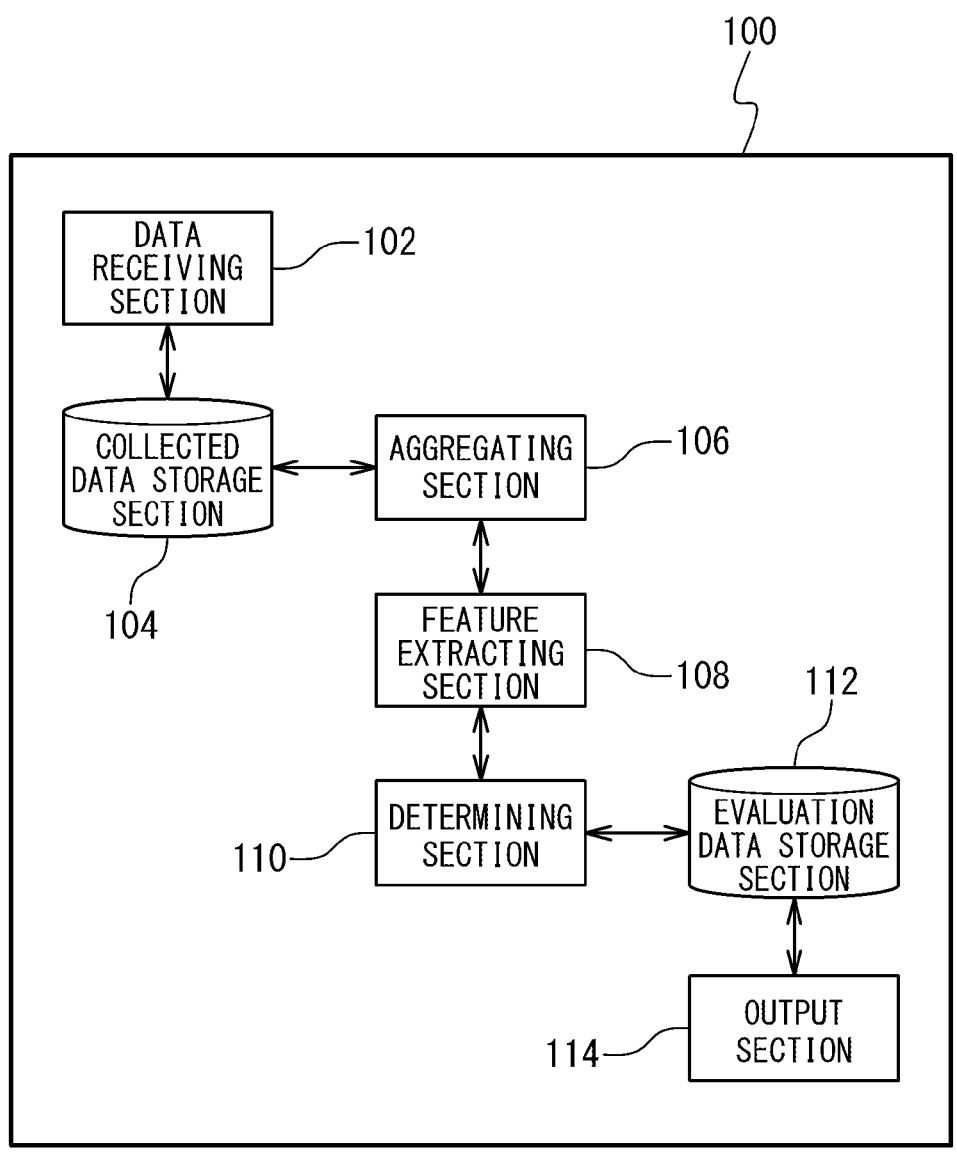
FIG. 1 is a functional block diagram showing a configuration of an information management apparatus according to a first exemplary embodiment of the present invention.

Hereinafter, an information management apparatus, a data processing method and a computer program according to exemplary embodiments of the present invention will be described with reference to the attached drawings. In the drawings, a configuration of a part not related to the essence of the present invention is omitted and is not illustrated.

[First Exemplary Embodiment]

First, the configuration of the information management apparatus 100 according to a first exemplary embodiment of the present invention will be described. FIG. 1 is a functional block diagram showing a configuration of the information management apparatus 100 according to the first exemplary embodiment of the present invention. The information management apparatus 100 is provided with a data receiving section 102, a collected data storage section 104, an aggregating section 106, a feature extracting section 108, a determining section 110, an evaluation data storage section 112, and an output section 114.

The information management apparatus 100 is an information processing apparatus which is exemplified by a computer. Each component (functional block) of the information management apparatus 100 and other information management apparatuses to be described later is realized with a program (software) which realizes components shown in FIG. 1 and so on by using a hardware configuration of the information processing apparatus. For example, the present invention is realized by executing data calculation processing for the purpose of these components through cooperation of a hardware configuration of the computer such as a CPU (Central Processing Unit), a memory, and a storage unit and a program (software) realizing the components of FIG. 1 stored in the storage unit and loaded into the memory. A skilled person in the art has known that there are various modification examples of the realizing method and apparatus. Hereinafter, each drawing to be described below shows not the hardware configuration but a block in units of the functions.

Therefore, the information management apparatus 100 can be realized by, for example, a computer which is provided with a CPU, a memory (main memory unit), a hard disk unit (auxiliary storage unit) and a communication unit, and is connected with an input unit such as a keyboard and a mouse and an output unit such as a display, a printer and so on.

The CPU the functions of the data receiving section 102 to the output section 118 can be realized by the CPU reading the program from the hard disk into the memory and executing it.

The data receiving section 102 is connected with a plurality of mobile equipments through a network. Each mobile equipment is carried by a user. The mobile terminal is installed with a position measuring unit such as GPS and a wireless LAN. The data receiving section 102 continuously receives position data from the mobile equipment appropriately (ex: periodically, every set time, or in response to a button operation by the user, and so on). The position data is composed of a position as a combination of latitude, longitude and altitude and so on, and an attribute such as a position measuring time and a user name to identify the user, and is generated by the position measuring unit. A position used to specify the use in a home or a working place may be contained in the position data. A position which clarifies a feature of hobbies and diversions such as a drinking spot or a golf course may be contained. A position where a level of privacy confidentiality to be protected is low, such as a sightseeing spot, a shopping mall and a place on the way of movement may be contained. It should be noted that the position may be not only pin point data expressed by latitude, the longitude, altitude and attitude so on, but also area data expressed by an area mesh code prescribed by the Ministry of Internal Affairs and Communications.

The user data storage section 104 stores the position data transmitted from the user and continuously received by the data receiving section 102 every user. That is, the user data storage section 104 relates and stores a user name (or a user ID), position measuring time and position measurement data. It is desirable that an action history is stored in time series. However, if the aggregating section 106 can refer to the action history at high speed, the present invention is not limited to the example.

The aggregating section 106 carries out the following processing every user to the position data which is stored in the collected data storage section 104. That is, a position data set is generated which is composed of position data which are continuous for a predetermined time and which are near to each other in position, by arranging the position data which are stored in the collected data storage section 104 in time series. A stay point is generated based on the position data set. Here, the stay point contains a position of optional position data which is contained in a position data set and a time zone in which the times of all the position data contained in the position data set are contained.

In detail, the aggregating section 106 extracts position data having a same user name from the position data stored in the collected data storage section 104. Next, the extracted position data are arranged in time series, and the position data which are near in position are grouped into a position data set. Specifically, the position data in a range of positions which are near to a degree determined for users to be in a same building, to be in a same condition, or perform a same operation, that is, in a range of 20-m diameter are grouped. Moreover, a time zone is calculated to contain all the position measurement times of the position data of the position data set, and a position data set is extracted from the position data based the times, based on which, it can be determined that the user stayed (not only passage). Next, a stay point is generated the position data set and a representative position of the position data set such as a gravity center of positions of all the position data of the position data set, the most positions and so on, and a time zone. The aggregating section 106 generates a stay point set having the stay points which are same or near in position and which have a same user name, as elements.

The feature extracting section 108 extracts a feature showing the privacy confidentiality of each stay point set. As such a feature, frequency, periodicity, continuity, public nature, dispersibility and so on are exemplified. The feature extracting section 108 extracts a feature of each of the stay point sets and includes it in the stay point set. In this case, the frequency shows the number of stay points which are contained in the stay point set. The periodicity shows a period of a time zone of the stay points which are contained in the stay point set. The continuity shows a length of the time zone of the stay points which are contained in the stay point set. The public nature shows the number of other stay point sets which contain the stay point which is in a same or near position as the stay point of the stay point set and which has a user name different from that of the stay point. The dispersibility is an index of distances between two of the stay points which are contained in the stay point set.

A feature showing the privacy confidentiality of the stay point set is extracted as a feature name and a feature degree. For example, it is supposed that the frequency is the feature name and the number of stay points of the stay point set is the feature degree. As another example, it is supposed that the periodicity is the feature name and a value showing to what degree the time zone of the stay points of the stay point set is periodic is the feature degree. Moreover, as another example, it is supposed that the continuity is the feature name and an average of lengths of the time zones of the stay points of the stay point set is the feature degree. Moreover, as another example, it is supposed that the public nature is the feature name and the number of other stay point sets which contain stay points which have a same or near position as or to positions of the stay points of the stay point set and which have user names different from those of the stay points is a feature degree. Moreover, as another example, it is supposed that the dispersibility is the feature name and the dispersibility of the position of each of the stay points of the stay point set is the feature degree.

The determining section 110 determines whether or not anyone of the frequency, periodicity, continuity, public and dispersibility meets a predetermined condition. That is, the determining section 110 stores the stay point set in which the feature name extracted by the feature extracting section 108 satisfies a feature degree higher than a predetermined level, in the evaluation data storage section 112 as the stay point set of high privacy confidentiality.

The evaluation data storage section 112 stores the stay point set which has a feature extracted by the feature extracting section 108 and which passed the determination by the determining section 110 (has the high privacy confidentiality). That is, the evaluation data storage section 112 stores a stay point set which has as elements, the stay points which contain a position data set of position data which have same user name, are continuous longer than a predetermined time, and are near in position, positions of optional ones of the position data contained in the position data set, a time zone in which times of all the position data contained in the position data set.

The output section 114 searches a stay point set from the evaluation data storage section 112 according to a request from a requester (viewer) and outputs it. For example, when a list of users who stayed in a specific area is specified, the output section 114 searches the evaluation data storage section 112 for the user having the stay points in the area and outputs a list of user names as elements.

Figure 2:
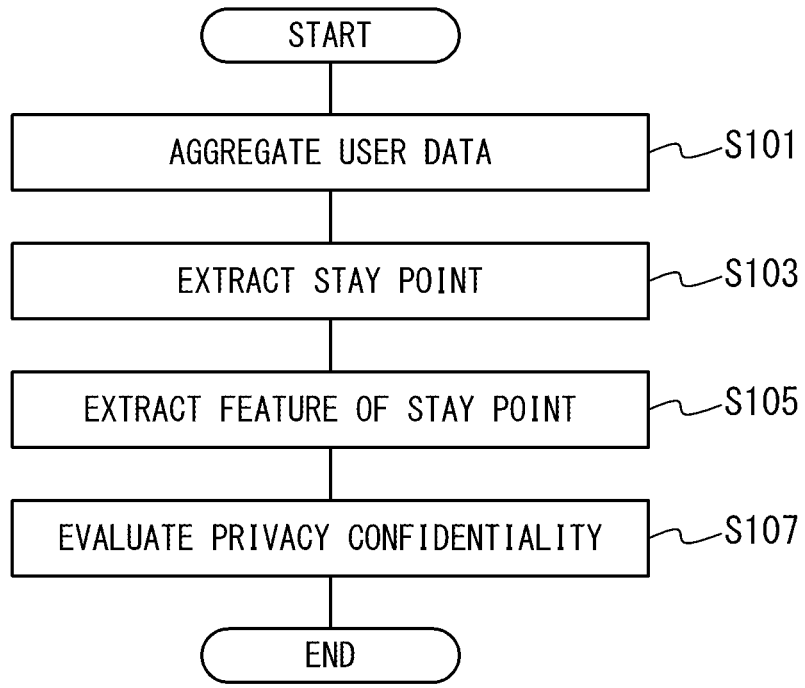
FIG. 2 is a flow chart showing an example of an operation (accumulation phase) of the information management apparatus according to the first exemplary embodiment of the present invention.
Figure 3:
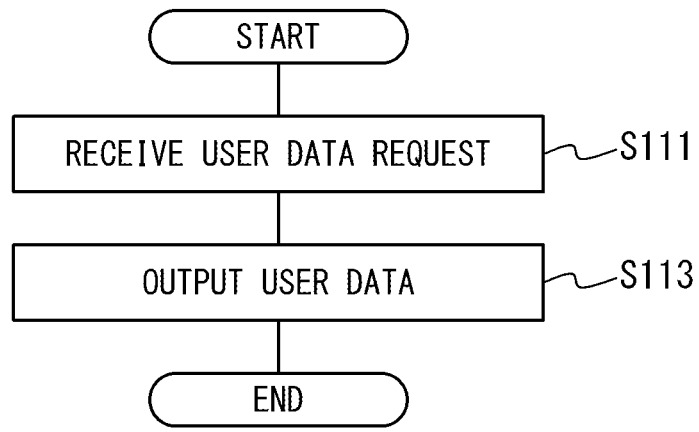
FIG. 3 is a flow chart showing an example of an operation (reference phase) of the information management apparatus according to the first to third exemplary embodiments of the present invention.

Next, an operation of the information management apparatus 100 according to the first exemplary embodiment of the present invention (a data processing method) will be described. FIG. 2 and FIG. 3 are flow charts showing an example of the operation of the information management apparatus 100 according to the first exemplary embodiment of the present invention. The operation of information management apparatus 100 is provided with an accumulation phase shown in FIG. 2 and a reference phase shown in FIG. 3. However, the accumulation phase contains a process of extracting a stay point having high privacy confidentiality of the stay points calculated from the position data set. The reference phase contains a process of outputting a stay point which meets a predetermined condition of the privacy confidentiality according to a request of a viewer.

First, the accumulation phase of FIG. 2 will be described. The data receiving section 102 periodically receives one or more position data, each of which is composed of a position determined based on a combination of latitude, longitude and altitude and so on, and an attribute of a position measuring time and a user name which identifies a user, from a mobile equipment (user). The data receiving section 102 stores the position data transmitted from the user in the collected data storage section 104 (collected data storage unit) every user (data receiving procedure: Step S101 of FIG. 2).

The aggregating section 106 extracts the position data having the same user name from the position data stored in the collected data storage section 104. Next, the aggregating section 106 arranges the position data in time series, groups position data near in position, and generates a position data set. Next, the aggregating section 106 generates a stay point containing a position data set, a representative position of the position data set, and a time zone containing position measuring times (time data) of all the position data of the position data set (stay point generation procedure: Step S101 of FIG. 2). The aggregating section 106 generates a stay point set as elements, the stay points which have same or near positions and a same user name (aggregation procedure: Step S103 of FIG. 2).

The feature extracting section 108 extracts the feature showing the privacy confidentiality of the stay point set such as frequency, periodicity, continuity, public nature, dispersibility and so on every stay point set and includes the extracted feature in the stay point set (feature extraction procedure: Step S105 of FIG. 2). Here, as an example of the feature showing the privacy confidentiality of the stay point set, an example is thought of in which the frequency is a feature name and the number of the stay points of the stay point set is a feature degree. Also, an example is thought of in which the periodicity is the feature name and the feature degree is a value showing to what degree a time zone of the stay point of the stay point set is periodic. Also, an example is thought of in which the continuity is the feature name and an average of lengths of the time zones of the stay points of the stay point set is the feature degree. Also, an example is thought of in which the public nature is the feature name and the number of stay point sets is a feature degree, wherein the stay points contained in the stay point set have same or near positions as or to the position of the stay point of the stay point set and have user names different from the user name of the stay point. Also, an example is thought of in which the dispersibility is the feature name and the dispersibility at the position of each of the stay points of the stay point set is the feature degree.

The determining section 110 determines whether at least one of the frequency, the periodicity, the continuity, the public nature and the dispersibility satisfies a predetermined condition. That is, the determining section 110 extracts the stay point set in which the feature name extracted by the feature extracting section 108 satisfies the feature degree equal to or higher than a predetermined level, and stores the extracted stay point set in the evaluation data storage section 112 (determination procedure: Step S107 of FIG. 2).

Next, the reference phase of FIG. 3 will be described. The output section 114 receives a request of the stay point set meeting a predetermined condition from a requester (a viewer) (receiving procedure: Step S111 of FIG. 3). The output section 114 searches the evaluation data storage section 112 to extraction the stay point set which meets the predetermined condition and outputs the searched stay point set to the requester (the viewer) (output procedure: Step S113 of FIG. 3).

As described above, according to the information management apparatus 100 of the present exemplary embodiment, the staying place related to the privacy confidentiality, especially the staying place of high privacy confidentiality can be extracted from miscellaneous position data. A manager of the privacy data manages data of privacy confidentiality more strictly and manages data of low privacy confidentiality simply. Also, a service provider can refer to the privacy data of high privacy confidentiality to extraction a feature of the individual, and provide a specialized service. The user who provided the position data can confirm to what degree own privacy confidentiality was disclosed.

[Second Exemplary Embodiment]

Figure 4:
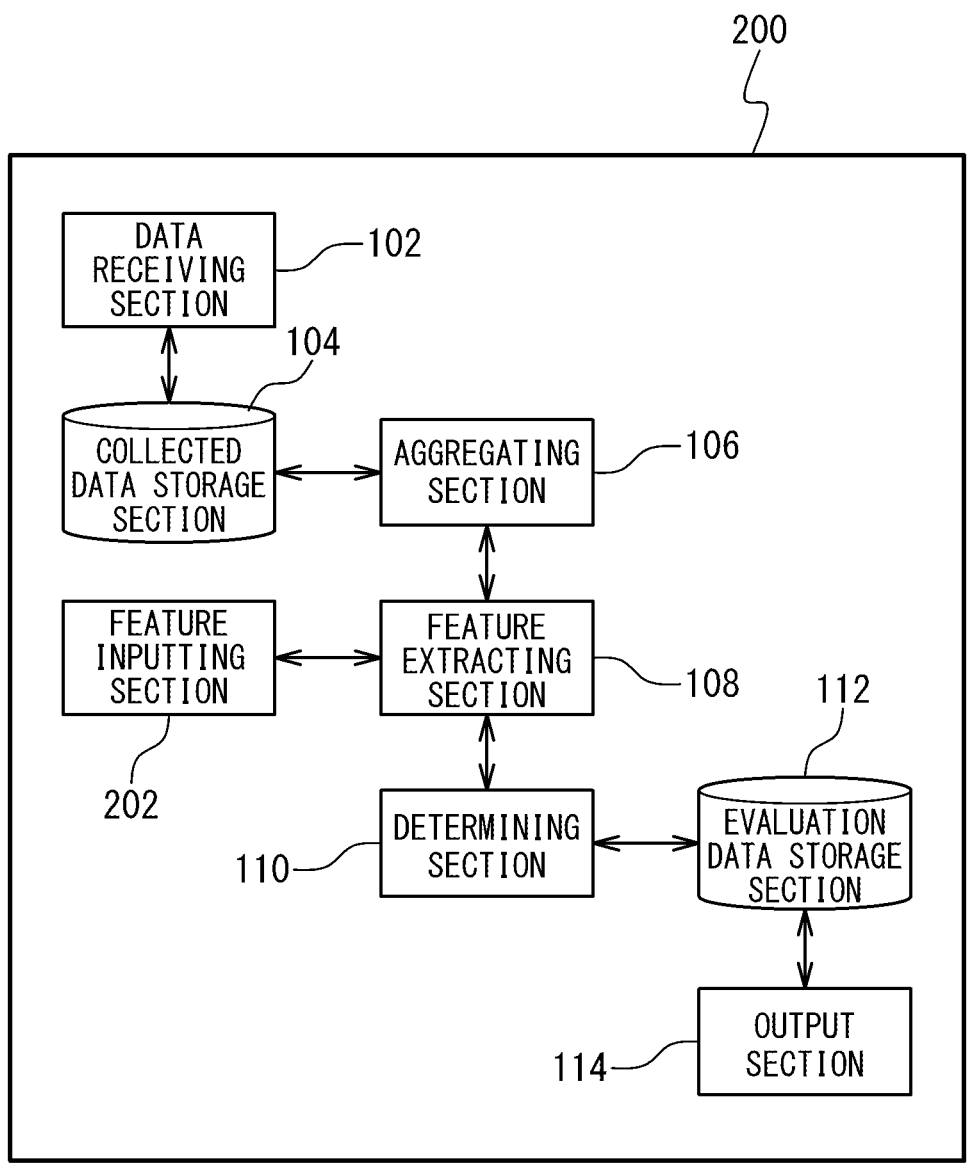
FIG. 4 is a functional block diagram showing a configuration of the information management apparatus according to the second exemplary embodiment of the present invention.

First, a configuration of the information management apparatus 200 according to a second exemplary embodiment of the present invention will be described. FIG. 4 is a functional block diagram showing the configuration of the information management apparatus 200 according to the second exemplary embodiment of the present invention. The information management apparatus 200 is provided with the data receiving section 102, the collected data storage section 104, the aggregating section 106, a feature inputting section 202, the feature extracting section 108, the determining section 110, the evaluation data storage section 112, and the output section 114.

The information management apparatus 200 according to the present exemplary embodiment is different from the information management apparatus 100 according to the first exemplary embodiment in that a feature of privacy confidentiality can be added to the stay point set and the stay point set can be changed. That is, the information management apparatus 200 in the present exemplary embodiment is further provided with the feature inputting section 202 in addition to the configuration of the information management apparatus 100 according to the first exemplary embodiment. Here, the feature inputting section 202 displays a feature item of privacy confidentiality extracted by the feature extracting section 108 and its feature degree and receives the change of the feature degree and the addition of new feature item and feature degree. The different configuration will be described below.

The feature inputting section 202 can correct the feature degree of the feature which cannot be sufficiently defined only by the position data collected so far, such as the periodicity, continuity, public nature, dispersibility and so on. The feature which cannot be determined based on the frequency, the periodicity, the continuity, the public nature, the dispersibility and so on, for example, the feature which is clarified in an individual and an attribute through one stay is newly inputted, and a feature name and a feature degree can be set.

Figure 5:
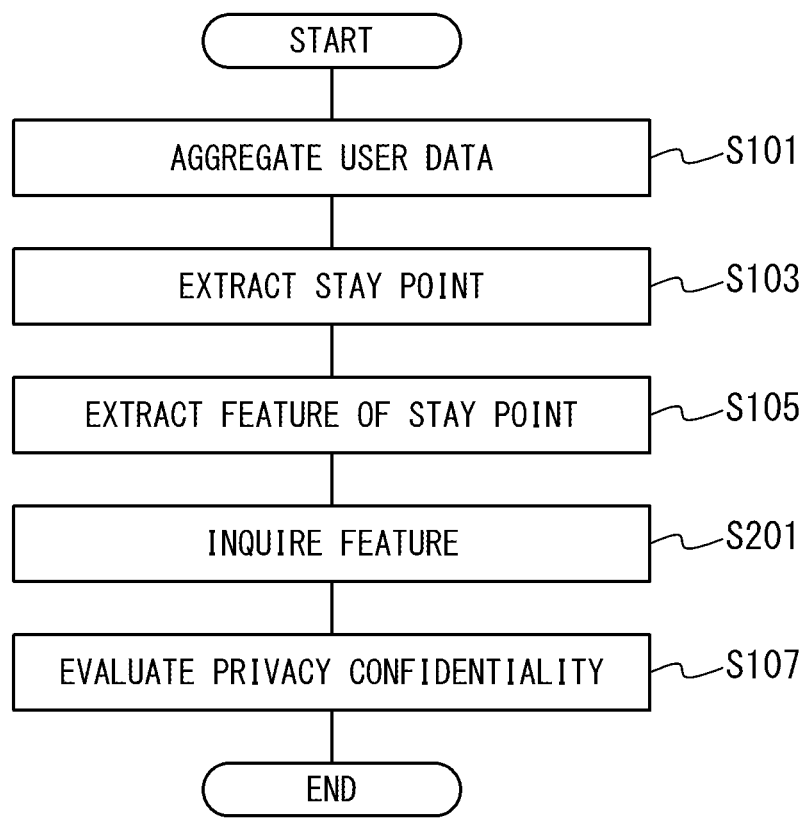
FIG. 5 is a flow chart showing an example of an operation (accumulation phase) of the information management apparatus according to the second exemplary embodiment of the present invention.

Next, the operation (data processing method) of the information management apparatus 200 according to the second exemplary embodiment of the present invention will be described. FIG. 5 and FIG. 3 are flow charts showing an example of the operation of the information management apparatus 200 according to the second exemplary embodiment of the present invention.

The operation of information management apparatus 200 is provided with an accumulation phase shown in FIG. 5 and the reference phase shown in FIG. 3. Here, the accumulation phase has the steps S101 to S107 as the operation of the information management apparatus 100 shown in FIG. 2 and a step S201 to be described below, as shown in FIG. 5. The reference phase has the same reference phase as the information management apparatus 100 shown in FIG. 3.

First, the accumulation phase of FIG. 5 will be described. The data receiving section 102 executes a data reception procedure (Step S101 of FIG. 5). The aggregating section 106 executes the aggregation procedure (Step S103 of FIG. 5). The feature extracting section 108 executes the feature extraction procedure (Step S105 of FIG. 5).

The feature inputting section 202 shows the feature of the privacy confidentiality extracted by the feature extracting section 108, and receives the input of a change of the feature (exemplified: a change of the feature degree) and an addition of a new feature or a deletion (exemplified: an addition or deletion of the feature name and the feature degree) (feature point input procedure: Step S201 of FIG. 5).

After that, the determining section 110 reflects the change of the feature (exemplified: the change of the feature degree) and the addition of the new feature (exemplified: the addition of the feature name and the feature degree) which are inputted at the step S201 and executes a determination procedure (step S107 of FIG. 5). Specifically, when there are a change of the feature (exemplified: the change of the feature degree) and the addition of the new feature or deletion (exemplified: the addition or deletion of the feature name and the feature degree) which are inputted at the step S201, the determining section 110 reflects the condition and determines whether at least one of the frequency, the periodicity, the continuity, the public nature and the dispersibility meets a predetermined condition. That is, the determining section 110 extracts a stay point set in which the feature name which is inputted from the feature inputting section 202, and the feature name extracted by the feature extracting section 108 satisfy the feature degree inputted from the feature inputting section 202 or a predetermined feature degree, and stores the stay point set in the evaluation data storage section 112 (determination procedure: Step S107 of FIG. 5). In this way, the change and the addition of the feature received by the feature inputting section 202 are reflected as the feature of the stay point set.

It should be noted that in the step S201 (feature point input procedure), the feature extracting section 108 may extraction a feature every stay point set again based on the change of the feature and the addition of the feature received by the feature inputting section 202, and may include the extracted feature into the stay point set (feature point extraction procedure). In this way, the change and addition of the feature which is received may be reflected as the feature of the stay point set. In the case, then, the determining section 110 executes the determination procedure (step S107 of FIG. 5), like FIG. 2.

Also, before the step S105 (feature extraction procedure), the step S201 may be executed (feature point input procedure). In this case, the feature extracting section 108 reflects the change of the feature (exemplified: the change of the feature degree) and the addition of the new feature (exemplified: the addition of the feature name and the feature degree) which are inputted at the step S201 and executes a feature extraction procedure (step S105 of FIG. 5). Specifically, when there are a change of the feature (exemplified: the change of the feature degree) and an addition of the new feature or deletion (exemplified: the addition or deletion of the feature name and the feature degree) which are inputted at the step S201, the feature extracting section 108 reflects the condition and extracts the feature of privacy confidentiality of the stay point set such as the frequency, periodicity, continuity, public nature, and dispersibility, every stay point set, and includes in the stay point set. After that, the determining section 110 executes the determination procedure (the step S107 of FIG. 5) like FIG. 2.

Next, the reference phase of FIG. 3 is executed. That is, the output section 118 executes the receiving procedure (step S111 of FIG. 3) and the output procedure (step S113 of FIG. 3).

As described above, according to the information management apparatus 200 of the present exemplary embodiment, the feature assigned to the stay point set can be corrected and added in addition to the effect of information management apparatus 100. Thus, by decreasing the privacy confidentiality of the data not to feel resistance to provision, the data can be widely distributed. Also, data which is not possible to analyze from the position data and which has high privacy confidentiality can be managed strictly.

[Third Exemplary Embodiment]

Figure 6:
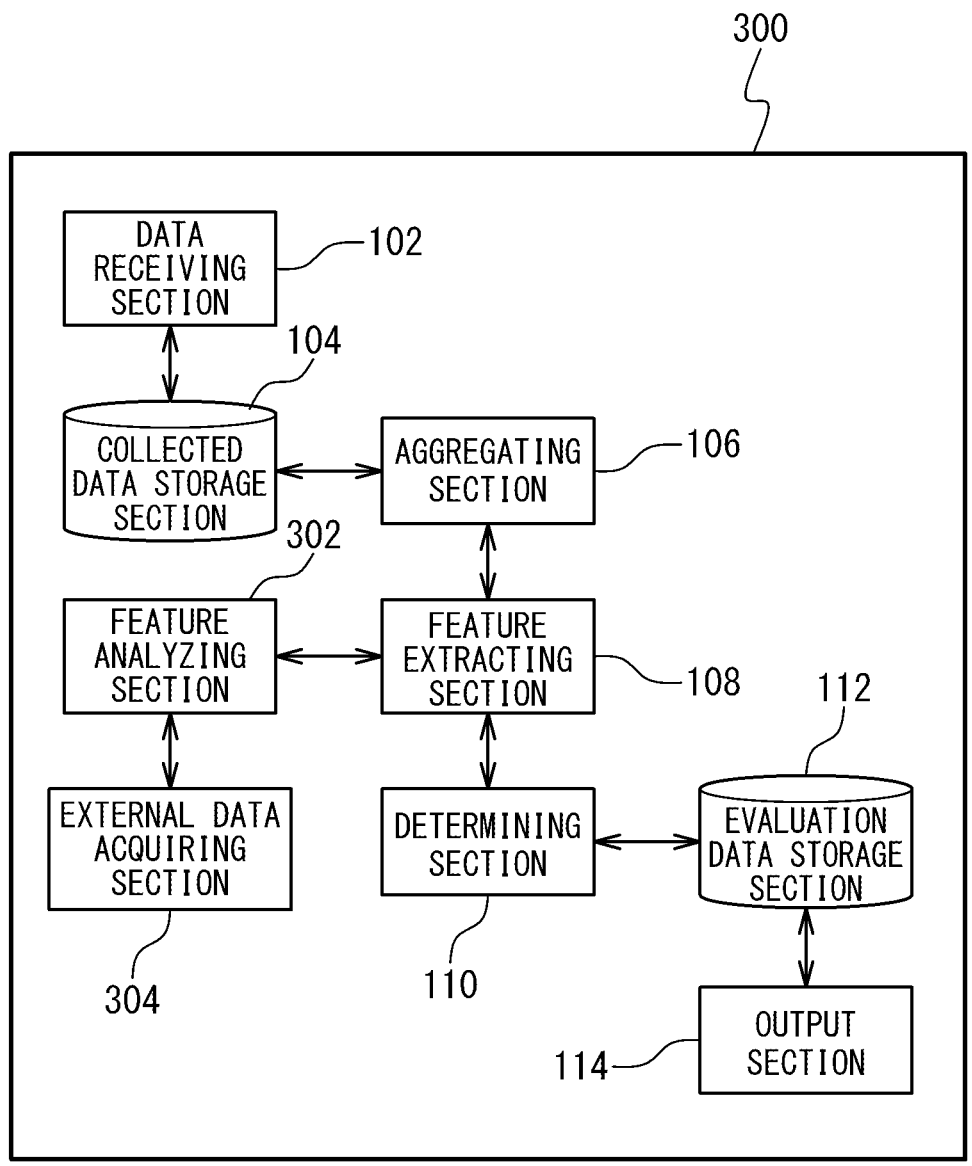
FIG. 6 is a functional block diagram showing a configuration of the information management apparatus according to the third exemplary embodiment of the present invention.

First, the configuration of the information management apparatus 300 according to a third exemplary embodiment of the present invention will be described. FIG. 6 is a functional block diagram showing the configuration of the information management apparatus 300 according to the third exemplary embodiment of the present invention. The information management apparatus 300 is provided with the data receiving section 102, the collected data storage section 104, the aggregating section 106, an external data acquiring section 304, a feature analyzing section 302, the feature extracting section 108, the determining section 110, and the evaluation data storage section 112, and the output section 114.

The information management apparatus 300 according to the present exemplary embodiment differs from the information management apparatus 100 according to the first exemplary embodiment in that position data of high privacy confidentiality is extracted from the information published on the Internet and so on, in addition to the position data. That is, the information management apparatus 300 in the present exemplary embodiment is further provided with the feature analyzing section 302 and the external data acquiring section 304 in addition to the configuration of the information management apparatus 100 according to the first exemplary embodiment. Here, the external data acquiring section 304 acquires the data about the user published on the Internet and so on. The feature analyzing section 302 analyzes the feature of the external data acquired by the external data acquiring section 304 and newly assigns a feature to the stay point set extracted by the feature extracting section 108. The different configuration will be described below.

The feature analyzing section 302 analyzes data of the user (exemplified: the data published on blog or Web page by a user himself) published on the Internet through the blog and so on, and converts a position shown with the data into position data. Then, a feature of high openness is added newly to the stay point set which has a position which is a same or near position as or to the position of the position data. That is, the information management apparatus 300 or the external data extracting section 304 can be provided with a converting section (not shown) which converts from data of a place name and so on into a position with latitude, longitude and so on. The feature analyzing section 302 is a place where the user has gone and converts a place name expressed with a text into a position by using the converting section. The stay point set can be specified. In this case, it is regarded as the feature of privacy confidentiality that feature which has openness as the feature name and a height (or lowness) of the openness as the feature degree is introduced.

In this case, the determining section 110 may determines that the stay point set with the high openness is high (feature degree: high) in the privacy confidentiality as data which can specify a user. Oppositely, the determining section 110 may determines that the stay point set with the high openness is low (feature degree: low) because it has been published. The external data acquiring section 304 may search optional data from the Internet and media, to select data having deep relation with the user. URL and so on may be inputted to search data having deep relation with the user.

Figure 7:
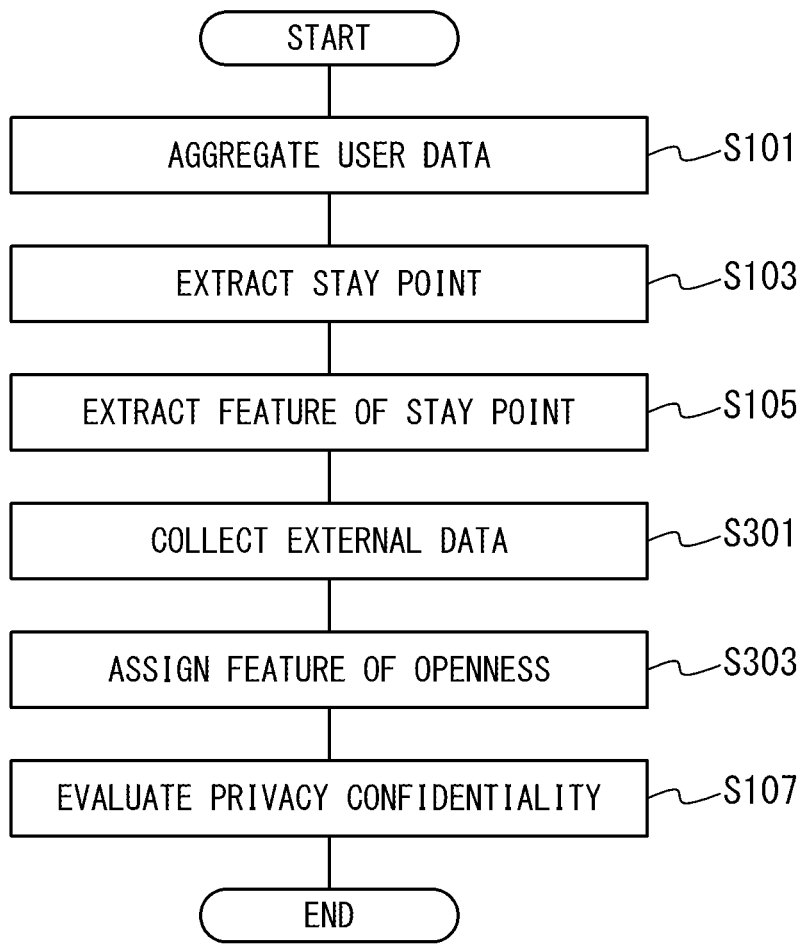
FIG. 7 is a flow chart showing an example of an operation (accumulation phase) of the information management apparatus according to the third exemplary embodiment of the present invention.

Next, the operation (data processing method) of the information management apparatus 300 according to the third exemplary embodiment of the present invention works will be described. FIG. 7 and FIG. 3 are flow charts showing an example of the operation of the information management apparatus 300 according to the third exemplary embodiment of the present invention. The operation of information management apparatus 300 is provided with an accumulation phase shown in FIG. 7 and the reference phase shown in FIG. 3. Here, the accumulation phase has the steps S101 to S107, like the operation of the information management apparatus 100 shown in FIG. 2, as shown in FIG. 7. Moreover, the accumulation phase has the steps S301 and S303 which will be described below. The reference phase has the same reference phase as the information management apparatus 100 shown in FIG. 3.

First, the accumulation phase of FIG. 7 will be described.

The data receiving section 102 executes the data receiving procedure (Step S101 of FIG. 7). The aggregating section 106 executes the aggregation procedure (Step S103 of FIG. 7). The feature extracting section 108 executes the feature extraction procedure (Step S105 of FIG. 7).

The external data acquiring section 304 collects data which is related to the user and which is published on the Internet and so on by using the blog of the user, or URL (Uniform Resource Locator) of the Web page and the user name as a hint to specify the user (external data collection procedure: Step S301 of FIG. 7).

Next, the feature analyzing section 302 specifies the stay point set which is generated by the aggregating section 106 and which has deep relation to the data collected by the external data acquiring section 304, and assigns the feature showing openness to the stay point set (feature giving procedure: Step S303 of FIG. 7).

After that, the determining section 110 reflects the assignment of the feature showing openness at step S303 and executes the determination procedure (step S107 of FIG. 7). Specifically, the determining section 110 reflects the condition when the feature showing openness is assigned at the step 303, and determines whether at least one of the frequency, the periodicity, the continuity, the public nature, the dispersibility and the openness meets a predetermined condition. That is, the determining section 110 extracts the stay point set which satisfies a predetermined feature degree to the openness inputted from the feature analyzing section 302 and the feature name extracted by the feature extracting section 108, and stores it in the evaluation data storage section 112 (determination procedure: Step S107 of FIG. 7). In this way, the openness assigned by feature analyzing section 302 is reflected as the feature of the stay point set.

It should be noted that in the step S303 (feature giving procedure), the feature extracting section 108 extracts a feature every stay point set again based on the feature showing the public nature assigned by the feature analyzing section 302, and includes it in the stay point set (feature point extraction procedure). In this way, the feature of openness assigned may be reflected on the stay point set as the feature. In the case, the determining section 110 executes the determination procedure (step S107 of FIG. 7) like FIG. 2.

Next, the reference phase of FIG. 3 is executed. That is, the output section 118 executes the receiving procedure (step S111 of FIG. 3) and the output procedure (step S113 of FIG. 3).

As described above, according to the information management apparatus 300 of the present exemplary embodiment, because the data published by the user can be used, the user can determines the privacy confidentiality of the stay point set by considering that there is not resistance in the openness or that anyone can know, in addition to the effect of information management apparatus 100.

[Fourth Exemplary Embodiment]

Figure 8:
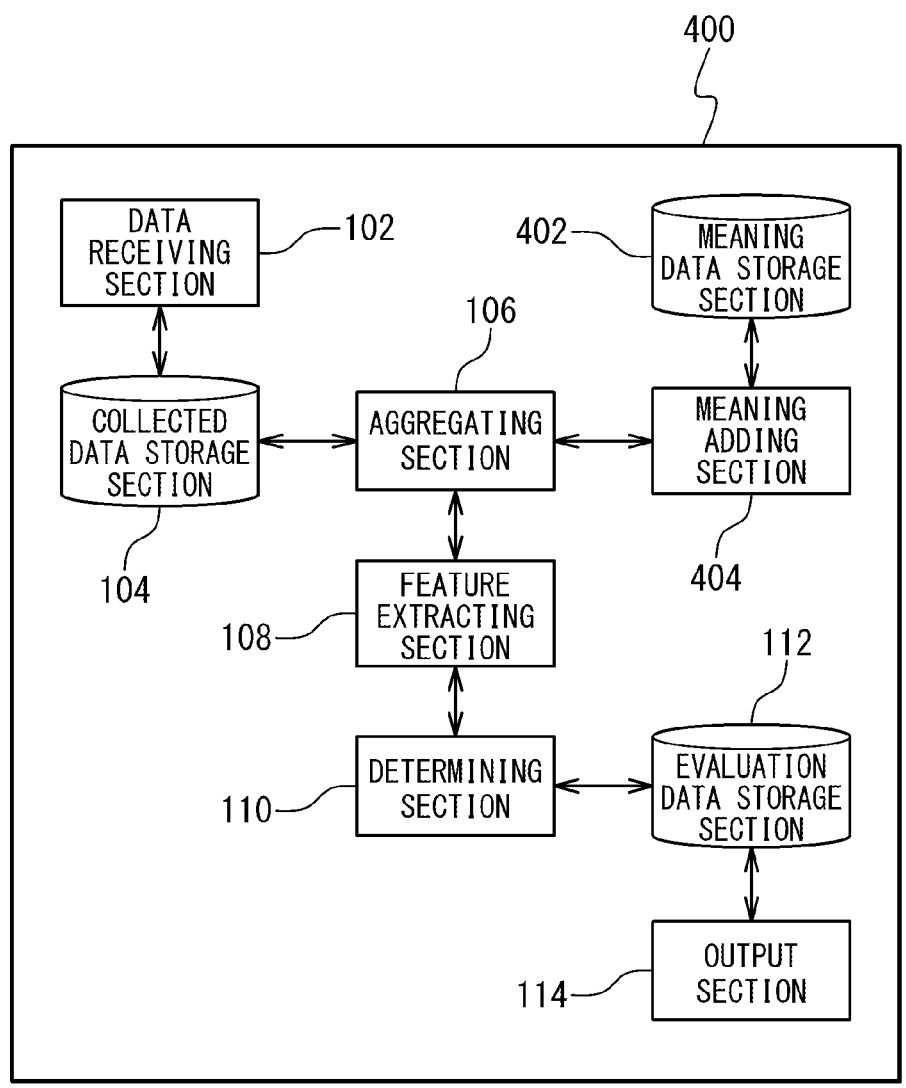
FIG. 8 is a functional block diagram showing a configuration of the information management apparatus according to a fourth exemplary embodiment of the present invention.

First, the configuration of the information management apparatus 400 according to the fourth exemplary embodiment of the present invention will be described. FIG. 8 is a functional block diagram showing the configuration of the information management apparatus 400 according to the fourth exemplary embodiment of the present invention. The information management apparatus 400 is provided with the data receiving section 102, the collected data storage section 104, the aggregating section 106, a meaning data storage section 402, a meaning adding section 404, the feature extracting section 108, the determining section 110, the evaluation data storage section 112, and the output section 114. The information management apparatus 400 according to the present exemplary embodiment differs from the information management apparatus 100 according to the first exemplary embodiment in that a meaning of the positions of the shopping area, the residential area and so on is further used, for determination of the privacy confidentiality. That is, the information management apparatus 400 in the present exemplary embodiment is further provided with the meaning data storage section 402 and the meaning adding section 404 in addition to the configuration of the information management apparatus 100 according to the first exemplary embodiment. Here, the meaning data storage section 402 stores the meaning data of the position. The meaning adding section 404 adds meaning data to the stay point set.

The meaning information storage section 402 stores the meaning data. Here, the meaning data is composed of a position, a name and type of a premise which exists in the position, and a feature of an area to which the position belongs. As such position data is composed of, for example, a position shown with latitude and longitude, a premise type such as a convenience store in the position, an attribute of the shopping area in which the convenience store exists, and so on. Moreover, the meaning data storage section 402 relates addition data to the meaning data and stores it. Here, the addition data is data showing permission or non-permission of disclosure and strength of privacy confidentiality and so on every category (attribute) of the meaning data. A setting section (not shown) may be further provided to set common addition data and individual addition data every user.

The meaning adding section 404 searches the meaning data storage section 402 to retrieve meaning data at a same or near position as or to the position of each stay point set generated by the aggregating section 106. By using the addition data related by the meaning data, the meaning adding section 404 assigns the contents of the addition data (exemplified: the disclosure permission or non-permission, the strength of privacy confidentiality) to the stay point set as the feature.

Figure 9:
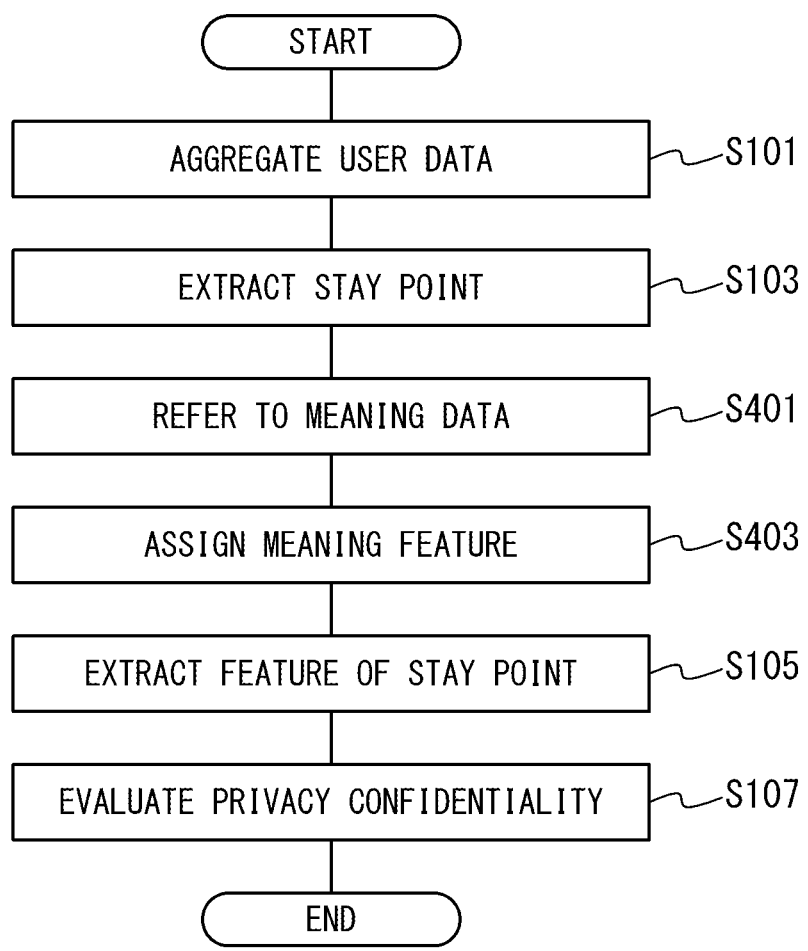
FIG. 9 is a flow chart showing an example of an operation (accumulation phase) of the information management apparatus according to the fourth exemplary embodiment of the present invention.

Next, the operation (data processing method) of the information management apparatus 400 according to the fourth exemplary embodiment of the present invention works will be described. FIG. 9 and FIG. 3 are flow charts showing an example of the operation of the information management apparatus 400 according to the fourth exemplary embodiment of the present invention. The operation of information management apparatus 400 is provided with an accumulation phase shown in FIG. 9 and the reference phase shown in FIG. 3. Here, the accumulation phase has the same steps S101 to S107 as the operation of the information management apparatus 100 shown in FIG. 2 and the steps S401 and S403 to be described below, as shown in FIG. 9. The reference phase has a reference phase like the information management apparatus 100 shown in FIG. 3.

First, the accumulation phase of FIG. 9 will be described. The data receiving section 102 executes the data receiving procedure (Step S101 of FIG. 9). The aggregating section 106 executes the aggregation procedure (Step S103 of FIG. 9).

The meaning adding section 404 refers to the meaning data storage section 402 to extraction the meaning data having a features such as the premise type and the area attribute in a same or near position as or to the position of the stay point set generated by the aggregating section 106 (meaning information reference procedure: Step S401 of FIG. 9). The meaning adding section 404 assigns the feature of the confidentiality and so on of the attachment data related to the extracted meaning data to the stay point set (meaning feature giving procedure: Step S403 of FIG. 9).

After that, the feature extracting section 108 executes the feature extraction procedure (Step S105 of FIG. 9). The determining section 110 executes the determination procedure (the step S107 of FIG. 9).

As described above, according to the information management apparatus 400 of this exemplary embodiment, the privacy confidentiality of the position to which the user has gone can be determined by using the feature of the place, in addition to the effect of information management apparatus 100. Specifically, the position data of a position that it is not desirable to be known to another person such as a hospital visit, pleasure and so on can be handled as the privacy data of high privacy confidentiality.

IMPLEMENTATION EXAMPLES

Implementation Example 1

As an implementation example of the information management apparatus of the present invention, an example (accumulation phase) in which the stay point set of high privacy confidentiality is extracted from the position data of the user which is measured periodically will be described.

The data receiving section 102 receives the position data periodically transmitted from one or more mobile equipments (users). The position data is stored in the collected data storage section 104 every user as shown in FIG. 10A and FIG. 10B (Step S101 of FIG. 2). In FIG. 10A and FIG. 10B, an attribute shown by a user name and a position measuring date and time (position measuring time), and a position shown with latitude and longitude are stored in the collected data storage section 104. For convenience, only the position data of user 1 is stored, but the position data of the other users may be stored.

The aggregating section 106 aggregates the position data which have a same user name and which are near in position in time series, of the position data stored in the collected data storage section 104, and generate a stay point as shown in FIG. 11 (Step S101 of FIG. 2). In FIG. 11, the stay point is composed of a identifier "No." of the stay point, a "user name" used to identify a user, a "time zone" in which the position data are contained as the stay point, a "position" aggregated as the stay point, and "the number" of the position data. Here, a stay point is generated from the position data which are continues in time and are within 200 m, to the user 1. That is, there are "stay points" N1-N4 in the "time zones" of 2009. 7. 1; 0:00-8:00 and 9:00-2:00, and 2009. 7. 2; 0:00-8:00 and 9:00-2:00, respectively. Then, the most "positions" of positions of the position data of the stay point are defined as a position of the stay point. For example, regarding the stay point N1, the position specified by (latitude and longitude) with the highest frequency of (35.673014, 139.74269) is "a position". In this case, if there is an appropriate position showing the stay point, a method of calculating is not limited. For example, the center of gravity of all the position data of the stay point may be calculated and one optional position may be selected.

The feature extracting section 108 generates a stay point set from the stay points which have a same user name and which are near to each other, as shown in FIG. 12 (Step S103 of FIG. 2). In FIG. 12, a stay point set is defined from an identifier "No." of the stay point set, a "user name" as the name of the user, a "stay point list", and a "position" representing a representative position of the stay point set. Here, the stay point set is generated by using the stay points whose positions are coincident with each other. For example, a stay point set S1 is generated by using the two stay points N1 and N3 which have the position shown with latitude 35.673014 and longitude 139.74269. Because the stay points N2 and N4 whose positions are coincident with each other do not exist, each of the stay point sets S2 and S3 is generated to contain one stay point.

Next, the feature extracting section 108 assigns each feature of the frequency, the periodicity, the continuity, the dispersibility to the stay point set ("No.") as shown in FIG. 13 (Step S105 of FIG. 2). The "frequency" is the number of the stay points contained in the stay point set, the "periodicity" is a period such as every day or once per week, and the "continuity" is an average of lengths of the "time zones" of the stay points contained in the stay point set, and the dispersibility shows a maximum distance between the stay points contained in the stay point set.

The determining section 110 tests whether or not a feature of the stay point set meets a predetermined condition, and determines the privacy confidentiality of the stay point set based on the test result (Step S107 of FIG. 2). In the determining section 110, a "feature name" and a "lower limit" are supposed to be set as the feature of the stay point set of high privacy confidentiality, as shown in FIG. 14. The determining section 110 stores the stay point set which meets at least one of the conditions shown in FIG. 14 in the evaluation data storage section 112 as the stay point set of high privacy confidentiality. That is, the determining section 110 stores the stay point sets S1 and S3 which meet one or more of the conditions shown in FIG. 14, of the feature of the stay point sets shown in FIG. 13, in the evaluation data storage section 112. It should be noted that the stay point set S1 meets the conditions because the frequency is twice or more, the periodicity satisfies is once or more per week, the continuity is 5 hours or longer, and the dispersibility is within 100-m, respectively. The stay point set S3 meets the conditions because the periodicity is once or more per week, and the dispersibility is within 100-m, respectively.

When being described in correspondence to the above-mentioned FIG. 11 to FIG. 14, the evaluation data storage section 112 can be shown in FIG. 15. As shown in FIG. 15, only the stay point set of high privacy confidentiality is stored in the evaluation data storage section 112.

The output section 114 receives a condition of the stay point set from a requester (a viewer) (Step S111 of FIG. 3), and transmits a stay point which meets the condition, from the stay point set stored in the evaluation data storage section 112 (Step S113 of FIG. 3). For example, the output section 114 receives an area name which is called "Tameike Sanno" tank pond mountain king and transmits the data of the stay point set S1 contained in the area to the requester (the viewer).

Implementation Example 2

Next, an example which the user changes and add a feature of the stay point set will be described as the implementation example of the information management apparatus of the present invention.

The feature inputting section 202 refers to a "position" of the position data of the stay point set shown in FIG. 12 and displays the data of the position and so on showing the feature of the stay point set and a representative feature, of the feature of the stay point set shown in FIG. 13 on the screen of the display and so on, as shown in FIG. 16A, at least. At this time, the position data may be displayed to show on the map, to make it easy to understand.

The user can correct the feature of the displayed stay point set, assign a new feature to the stay point set, and newly add the stay point set (Step S201 of FIG. 5). As shown by a thick-line square in FIG. 16B, the user changes the periodicity of the stay point set S2 from "nothing" to "twice per week". That is, the data of FIG. 16A is changed to data of FIG. 16B. Thus, the determining section 110 stores the stay point set S2 in the evaluation data storage section 112 as the privacy data of high privacy confidentiality (Step S107 of FIG. 5).

Implementation Example 3

Next, an example which a feature is assigned to the stay point set by using the data published on the Internet and so on will be described as the implementation example of the information management apparatus of the present invention.

It is supposed that the external data acquiring section 304 is connected with the Internet as shown in FIG. 17 and is accessible to the Web pages such as blog. The external data acquiring section 304 receives a keyword and a URL of a Web page related to the user, downloads the Web page from the Internet, and transfers to the feature analyzing section 302 (Step S301 of FIG. 7). In FIG. 17, http://xxx.xxx.xxx is transferred as URL of blog page of the user.

The feature analyzing section 302 picks up a keyword related with an action of the user from the Web page and converts into a corresponding position data. In FIG. 17, the Tokyo Tower is converted into latitude and longitude (35.676555, 139.4494) showing the position. The feature analyzing section 302 searches the stay point set from FIG. 12, and specifies that stay point set is S3. The feature analyzing section 302 assigns the feature of "openness" to the stay point set S3 (Step S303 of FIG. 7).

For example, the determining section 110 does not store the stay point set S3 having the openness assigned in the evaluation data storage section 112 as the data of low privacy confidentiality.

Implementation Example 4

Next, an example which a feature is assigned to the stay point set by using meaning data to a position will be described as the implementation example of the information management apparatus of the present invention.

A "name" of a premise and facilities is stored in the meaning data storage section 402 as the meaning data as well as a feature of the area, i.e. the "public nature", with respect to the "position" as shown in FIG. 18.

The meaning adding section 404 refers to the meaning data storage section 402 to retrieve the stay point set corresponding to the position stored in the meaning storage section 402 to the stay point set which was gotten like FIG. 12 (Step S401 of FIG. 9). The meaning data is assigned to the matched stay point set (Step S403 of FIG. 9). In an example of FIG. 18 and FIG. 12, the "prime minister official residence" is assigned to point S1 and the "Diet Building" is assigned to point S2, and "Tokyo Tower" is assigned to point S3.

The feature extracting section 108 assigns a feature to the stay point set to which the meaning data assigned (Step S105 of FIG. 9). For example, it is supposed that the privacy confidentiality is low with respect to the "prime minister official residence" and the Diet Building. The determining section 110 does not store the stay point sets S1 and S2 to which a feature is assigned to show that the privacy confidentiality is low, in the evaluation data storage section 112 (Step S107 of FIG. 9).

According to the exemplary embodiments (implementation examples), the privacy data of high privacy confidentiality and the privacy data of low privacy confidentiality can be separated from the action history which is a set of the plurality of position data. Thus, regarding the privacy data of high privacy confidentiality, data can be provided after carrying out the protection of the privacy confidentiality appropriately by anonymizing separately, and data can be provided to only a reliable trader with respect to the protection of the privacy confidentiality. On the other hand, the data can be provided just as it is to privacy data of low privacy confidentiality. In this way, by separating the privacy data of high privacy confidentiality and the privacy data of low privacy confidentiality, the position data can be widely provided, while protecting the privacy confidentiality appropriately. Thus, a similar effect can be obtained to the other action data (the life log) in addition to the position data.

According to the above exemplary embodiments (implementation examples), the present invention can be applied to an information providing apparatus and a program to make a computer realize the information providing apparatus which provides data personalized for a user from the position data of high privacy confidentiality extracted from the action history. Also, in case of disclosure of the position data, the present invention can be applied to an information protection apparatus which anonymizes the data of high privacy confidentiality, and a program to make a computer realize the information protection apparatus.

It should be noted that in the above exemplary embodiments (implementation examples), an optional combination of components of the exemplary embodiments (implementation examples), and a method, apparatus, recording medium and computer program which are converted from the expression of the exemplary embodiments (implementation examples) are effective as examples of the present invention.

Also, each component of the exemplary embodiments (implementation examples) is not always independent entity. A plurality of components may be formed as one equipment, one component may be formed from a plurality of equipments, some component may be a part of another component, and a part of some component and a part of another component may overlap.

Also, in the data processing method and a computer program in the exemplary embodiments (implementation examples), a plurality of procedures are described in order. However, the order does not limit the order of execution of the plurality of procedures. Therefore, when the data processing method and the computer program in the exemplary embodiments (implementation examples) are implemented, the order of the plurality of procedures can be changed in a range where there is no hindrance.

Moreover, the present invention is not limited to a case that the plurality of procedures in the data processing method and the computer program in the exemplary embodiments (implementation examples) are executed at differing timings. Therefore, a procedure may be executed during execution of another procedure, and a procedure and another procedure may be executed to overlap partially and wholly in timing.

As described above, the present invention has described with reference to the exemplary embodiments (implementation examples). However, the present invention is not limited to the exemplary embodiments (implementation examples). Various modifications that a skilled person in the art can understand in the scope of the present invention can be carried out to the configuration and the details of the present invention. Also, the techniques in the exemplary embodiments (implementation examples) can be combined in a range of no contradiction.

This patent application claims a priority based on Japanese Patent Application No. JP 2009-235057 filed on Oct. 9, 2009. The disclosure thereof is incorporated herein by reference.

The invention claimed is:

1. An information management apparatus comprising:
a data receiving section configured to periodically receive action data showing an action of a user;
a collected data storage section configured to store the action data received by said data receiving section every user;
an aggregating section configured to generate a data set every user by aggregating action data containing an approximate content, of the action data stored in said collected data storage section;
a feature extracting section configured to extract an index and a reference showing privacy confidentiality of said data set as a feature to incorporate in said data set;
a determining section configured to determine whether or not the privacy confidentiality of the feature of said data set is equal to or higher than a predetermined level; and
an evaluation data storage section configured to store said data set which passed said determining section.

2. The information management apparatus according to claim 1, wherein said action data is position data containing a position of a mobile equipment which belongs to the user and an attribute composed of a position measuring time of the position and identification data of the user.

3. The information management apparatus according to claim 2, wherein said data receiving section receives position data from one or more mobile equipments,
wherein said collected data storage section stores the position data received by said data receiving section every user,
wherein said aggregating section generates said position data set of the position data which are continuous for a predetermined time when arranging the position data stored in said collected data storage section every user in time series, and which are near in position, generates a stay point containing a position of an optional position data which is contained in said position data set and a time zone in which times of all the position data contained in said position data set are contained, and generates as said data set, a stay point set having as elements, the stay points which have a same position or near positions and which are for a same user, wherein said feature extracting section extracts as a feature, a stay point feature showing the privacy confidentiality of the stay point which is contained in said stay point set, and incorporates the feature into said stay point set, wherein said determining section determines whether or not the privacy confidentiality of the stay point feature of said stay point set is equal to or higher than the predetermined level, and wherein said evaluation data storage section stores said stay point set which passed said determining section.

4. The information management apparatus according to claim 3, wherein said stay point feature is at least one of:

frequency showing the number of stay points contained in said stay point set;

periodicity showing a period of a time zone of the stay point contained in said stay point set;

continuity showing a length of the time zone of the stay point contained in said stay point set;

public nature showing the number of stay point sets which contain the stay points which have same or near positions as or to a position of any of the stay points of said stay point set and which have user names different from the user name of any of the stay points; and dispersibility having a distance between the stay points contained in said stay point set as an index.

5. The information management apparatus according to claim 3, further comprising:

a feature inputting section configured to correct at least one of the features of the frequency, the periodicity, the continuity, the public nature and the dispersibility, or input a user definition feature which is different from any of the features.

6. The information management apparatus according to claim 5, wherein said determining section uses the user definition feature of the features contained in said data set for the determination of the privacy confidentiality primarily.

7. The information management apparatus according to claim 3, further comprising:

an external data acquiring section configured to collect a place contained in data published on the Internet by the user; and a feature analyzing section configured to analyze the place collected by said external data acquiring section to specify an open position, and assigns an open feature to said stay point set when the position of the stay point contained in said stay point set is same as or near to the open position.

8. The information management apparatus according to claim 3, further comprising:

a meaning data storage section configured to store a correspondence relation of the position data stored in said collected data storage section and a meaning showing a feature of an entity in the position of said position data; and a meaning adding section configured to acquire the meaning corresponding to the position contained in the position data stored in said collected data storage section from said meaning data storage section and adds said meaning to said position data, wherein said aggregating section generate said position data set of the position data which are continuous for a predetermined time when arranging the position data stored in said collected data storage section in time series, which are near in position, and which have a same meaning, and carries out every user, processing of generating the stay point which contains the position of optional position data which is contained in said position data set, and a time zone in which times of all the position data contained in said position data set.

9. The information management apparatus according to claim 1, further comprising:

a feature inputting section configured to correct the feature extracted by said feature extracting section or add an index and a level showing the privacy confidentiality which are different from the feature as a feature.

10. The information management apparatus according to claim 1, further comprising:

an external data acquiring section configured to collect data about the action of the user published onto a network; and a feature analyzing section configured to add, when the data collected by said external data acquiring section is contained in said data set generated by said aggregating section, an open feature which is different from any of the features contained in said data set, to said data set as a feature.

11. The information management apparatus according to claim 10, wherein when the open feature is contained as the feature contained in said data set, said determining section does not store said data set in said evaluation data storage section or primarily store said data set in said evaluation data storage section.

12. The information management apparatus according to claim 1, further comprising:

a meaning data storage section configured to relate and store the action data stored in said collected data storage section and a meaning of the action data; and a meaning adding section configured to refer to said meaning data storage section and add the meaning corresponding to the action data to the action data, wherein said aggregating section aggregates the action data which are stored in said collected data storage section, and which are approximate in meaning added to the action data by said meaning adding section added and generates a data set every user.

13. A data processing method of an information management apparatus, wherein said information management apparatus comprises a collected data storage section configured to store action data showing an action of a user every user, wherein said data processing method comprises:

periodically receiving said action data to store in said collected data storage section;

generating a data set every user by aggregating the action data, which have an approximate content, of the action data stored in said collected data storage section to generate a data set every user;

extracting as a feature, an index and reference showing the privacy confidentiality of said data set as the feature to incorporate into said data set;

determining whether or not the privacy confidentiality of the feature of said data set is equal to or higher than a predetermined threshold value; and storing said data set which passed said determining section in an evaluation data storage section.

14. The data processing method according to claim 13, wherein said action data is position data containing a position of a mobile equipment which belongs to the user and an attribute composed of a position measuring time of the position and identification data of the user.

15. The data processing method according to claim 14, wherein said storing comprises:
receiving position data from one or more mobile equipments and storing every user in said collected data storage section,
wherein said generating step comprises:
generating said position data set of the position data which are continuous for a predetermined time when arranging the position data stored in said collected data storage section every user in time series, and which are near in position, generating a stay point containing a position of an optional position data which is contained in said position data set and a time zone in which times of all the position data contained in said position data set are contained, and generating as said data set, a stay point set having as elements, the stay points which have a same position or near positions and which are for a same user,
wherein said incorporating comprises:
extracting as a feature, a stay point feature showing the privacy confidentiality of the stay point which is contained in said stay point set, and incorporating the feature into said stay point set,
wherein said determining comprises:
determining whether or not the privacy confidentiality of the stay point feature of said stay point set is equal to or higher than the predetermined level, and
wherein said storing comprises:
storing said stay point set which passed said determining section.

16. The data processing method according to claim 15, wherein said stay point feature is at least one of:
frequency showing the number of stay points contained in said stay point set;
periodicity showing a period of a time zone of the stay point contained in said stay point set;
continuity showing a length of the time zone of the stay point contained in said stay point set;
public nature showing the number of stay point sets which contain the stay points which have same or near positions as or to a position of any of the stay points of said stay point set and which have user names different from the user name of any of the stay points; and
dispersibility having a distance between the stay points contained in said stay point set as an index.

17. The data processing method according to claim 15, further comprising:
correcting at least one of the features of the frequency, the periodicity, the continuity, the public nature and the dispersibility, or inputting a user definition feature which is different from any of the features,
wherein said determining comprises:
using the user definition feature of the features contained in said data set for the determination of the privacy confidentiality primarily.

18. The data processing method according to claim 15, further comprising:
collecting a place contained in data published on the Internet by the user; and
analyzing the place collected by said external data acquiring section to specify an open position, and assigns an open feature to said stay point set when the position of the stay point contained in said stay point set is same as or near to the open position.

19. The data processing method according to claim 15, wherein said data management apparatus further comprises:
a meaning data storage section configured to store a correspondence relation of the position data stored in said collected data storage section and a meaning showing a feature of an entity in the position of said position data,
wherein said data processing method further comprises:
acquiring the meaning corresponding to the position contained in the position data stored in said collected data storage section from said meaning data storage section and adding said meaning to said position data,
wherein said generating comprises:
generating said position data set of the position data which are continuous for a predetermined time when arranging the position data stored in said collected data storage section in time series, which are near in position, and which have a same meaning, and carrying out every user, processing of generating the stay point which contains the position of optional position data which is contained in said position data set, and a time zone in which times of all the position data contained in said position data set.

20. The data processing method according to claim 13, further comprising:
correcting the feature extracted by said feature extracting section or adding an index and a level showing the privacy confidentiality which are different from the feature as a feature.

21. The data processing method according to claim 13, further comprising:
collecting data about the action of the user published onto a network; and
adding, when the data collected by said external data acquiring section is contained in said data set generated by said aggregating section, an open feature which is different from any of the features contained in said data set, to said data set as a feature,
wherein said determining comprises:
when the open feature is contained as the feature contained in said data set, stopping storing said data set in said evaluation data storage section or primarily storing said data set in said evaluation data storage section.

22. The data processing method according to claim 13, wherein said information management apparatus further comprises:
a meaning data storage section configured to relate and store the action data stored in said collected data storage section and a meaning of the action data,
wherein said data processing method further comprises:
referring to said meaning data storage section and adding the meaning corresponding to the action data to the action data, and
wherein said generating comprises:
aggregating the action data which are stored in said collected data storage section, and which are approximate in meaning added to the action data by said meaning adding section added and generating a data set every user.

23. A non-transitory computer-readable storage medium in which a program code is stored to attain a data processing method which comprises:
periodically receiving action data to store in said collected data storage section, wherein the action data showing an action of a user is stored in a collected data storage section every user;

generating a data set every user by aggregating the action data, which have an approximate content, of the action data stored in said intelligence section to generate a data set every user;
extracting as a feature, an index and reference showing the privacy confidentiality of said data set as the feature to incorporate into said data set;
determining whether or not the privacy confidentiality of the feature of said data set is equal to or higher than a predetermined threshold value; and
storing said data set which passed said determining section in an evaluation data storage section.

* * * * *